United States Patent

Vollmann

[11] Patent Number: 5,883,755
[45] Date of Patent: Mar. 16, 1999

[54] APPARATUS FOR STORAGE AND/OR REPRODUCTION OF INFORMATION ON/FROM AN INFORMATION CARRIER

[75] Inventor: Norbert C. Vollmann, Eindhoven, Netherlands

[73] Assignee: U.S. Philips Corporation, New York, N.Y.

[21] Appl. No.: 895,466

[22] Filed: Jul. 16, 1997

[30] Foreign Application Priority Data

Oct. 21, 1996 [EP] European Pat. Off. ............. 9620934.4

[51] Int. Cl.$^6$ .................................................. G11B 5/008
[52] U.S. Cl. ......................... 360/96.5; 360/93; 360/99.06
[58] Field of Search ................................ 369/75.1, 75.2, 369/77.1, 77.2; 360/93, 95, 96.5, 96.6, 85, 99.06, 99.02

[56] References Cited

U.S. PATENT DOCUMENTS

| 5,126,899 | 6/1992 | Kanazawa | 360/99.07 |
| 5,297,117 | 3/1994 | Uzuki et al. | 369/75.2 |
| 5,426,547 | 6/1995 | Lock et al. | 360/96.5 |
| 5,440,435 | 8/1995 | Busengdal et al. | 360/96.5 |
| 5,629,816 | 5/1997 | Busengdal et al. | 360/96.5 |

FOREIGN PATENT DOCUMENTS

| 1-133255 | 5/1989 | Japan . |
| 2-134761 | 5/1990 | Japan . |
| 2-162561 | 6/1990 | Japan . |

Primary Examiner—William J. Klimowicz
Attorney, Agent, or Firm—Steven S. Rubin

[57] ABSTRACT

The invention relates to an apparatus for the storage and/or reproduction of information on/from an information carrier accommodated in a cartridge. The apparatus comprises a motorized loader for the motorized loading of a cartridge. The apparatus has a mechanism by which the cartridge can be removed from the apparatus in the case of faults. The mechanism is based on the fact that the motorized loading mechanism comprises an element which can be uncoupled from the chassis of the apparatus

13 Claims, 7 Drawing Sheets

FIG. 9

APPARATUS FOR STORAGE AND/OR REPRODUCTION OF INFORMATION ON/FROM AN INFORMATION CARRIER

BACKGROUND OF THE INVENTION

1. Field of the Invention

The invention relates to an apparatus for the storage and/or reproduction of information on/from an information carrier accommodated in a cartridge, which apparatus comprises a chassis, a device for cooperation with the information carrier, a cartridge space for receiving a cartridge, which cartridge space is accessible via an opening in a wall of the apparatus, a movable gripper arranged in the cartridge space and adapted to grip the cartridge, a first mechanism comprising an electric motor and a wheel drivable by the motor, which wheel cooperates with an element for moving the gripper in an inward direction from a loading position, in which the cartridge can be inserted, into an operational position, in which the information carrier can cooperate with the device, and for moving the gripper in an outward direction from the operational position to the loading position, and a second mechanism adapted to move the gripper in an outward direction from the operational position to the loading position without the motor being energized.

2. Description of Related Art

Such an apparatus is known from JP-2-236860. The known apparatus is a disk drive comprising a motorized loader and a manually actuated ejection button for ejecting a cartridge, which has been loaded into the apparatus and which accommodates a disk, in the case that the motorized loader does not function. The apparatus has a chassis and a cartridge holder which is movable relative to the chassis. An electric motor is mounted on the chassis to drive a gear wheel which is in mesh with a gear rack connected to the cartridge holder. By energizing the motor the cartridge holder can be moved from a loading position to an operational position. The known apparatus further comprises a mechanism for disengaging the gear wheel and the gear rack from one another and for moving the gear rack and, consequently, the cartridge holder in the outward direction. This mechanism can be actuated by means of a push-button on the outside of the apparatus. A disadvantage of the known apparatus is that the overall height of the apparatus is large in relation to the corresponding dimension of the cartridge. Another disadvantage of the known apparatus is that the mechanism comprises a large number of parts. A further disadvantage is that by means of the eject button the cartridge holder can be moved only over a small distance.

SUMMARY OF THE INVENTION

It is an object of the invention to provide an apparatus of the type defined in the opening paragraph, which is of simple construction. To this end, the apparatus in accordance with the invention is characterized in that the electric motor is mounted on the gripper, and the second mechanism comprises coupling means adapted to selectively couple the element and the chassis. As a result of these measures, a cartridge can simply be removed from the apparatus in the event of a fault. By disengaging the element from the chassis and moving the element in the outward direction the gripper and the cartridge are moved in the outward direction, after which the cartridge can be removed from the gripper by hand. The wheel and the element then do not move relative to one another, so that no mechanism is required to disengage the wheel and the element from one another. As a result of this, the apparatus in accordance with the invention is of simpler construction than the known apparatus. Moreover, the construction in accordance with the invention requires less space because the dimension of the movable part in the inward direction is substantially smaller than in the known apparatus. This is due to the fact that the motor and the wheel are disposed on the gripper. In addition, the measures in accordance with the invention always allow the gripper to be moved back to the loading position regardless of the distance between the loading position and the operational position.

An embodiment of the apparatus in accordance with the invention is characterized in that the coupling means comprise a slide, which slide has a guide surface which cooperates with the element to move the element from a position in which the element is locked against movement in the outward direction relative to the chassis to a position in which the element is movable in the outward direction, and the apparatus comprises a handle for actuating the slide.

These measures enable the element to be disengaged from the chassis by simply pulling the handle, which allows the element to perform movements relative to the chassis in the outward direction. After this, the gripper can be moved to the loading position by pulling the handle farther away from the apparatus. Owing to these measures the cartridge can be removed from the apparatus in one movement.

An embodiment of the apparatus in accordance with the invention is characterized in that the coupling means comprise a locking device for locking the element relative to the chassis. These measures prevent the element from being inadvertently disengaged from the chassis.

An embodiment of the apparatus in accordance with the invention is characterized in that the apparatus is adapted to unlock the locking device when the electric power supply of the apparatus cuts out. These measures ensure that a user cannot remove the cartridge while the apparatus is busy recording information on the information carrier, while in a fault condition unlocking is always possible by turning off the power supply of the apparatus. This is an important feature because the information on the information carrier can be lost if, for example, writing of the table of contents is interrupted in that a user removes the cartridge with the aid of the second mechanism.

An embodiment of the apparatus in accordance with the invention is characterized in that the wheel cooperates with the element through contact of a first contact surface of the wheel with a second contact surface of the element, that the second contact surface comprises a first part which extends in the inward direction and a second part which extends at a first angle between 45 and 90 degrees relative to the inward direction. These measures result in a first transmission ratio between one revolution of the motor shaft and the movement of the gripper when the wheel driven by the motor cooperates with the first part of the second contact surface and a second transmission ratio when the wheel cooperates with the second part of the second contact surface. As a result, the cartridge is moved from the loading position into the apparatus with a comparatively high speed and the cartridge is moved into the operational position with a comparatively low speed. This is advantageous because it ensures that the cartridge is brought into the operational position more accurately. Moreover, the cartridge is moved with greater power in the case of the second transmission ratio. This is of particular importance if the cartridge is of a type in which the information carrier is driven by means of a drive roller in the apparatus, which roller is to be pressed against a drivable roller in the cartridge. Another advantage of this embodiment is that, as a result of this, the first mechanism can readily be made self-braking by an appropriate choice of the acute angle. The self-braking effect increases as this angle approximates more closely to 90 degrees.

In this embodiment of the apparatus in accordance with the invention it is also advantageous if the element is pivotably coupled to the chassis. This measures makes it possible to obtain a linear movement of the gripper between the loading position and the operational position while the wheel has a fixed position on the gripper. Preferably, the gripper comprises means, for example a roller or a pin, which cooperate with a surface of the element to keep the first contact surface and the second contact surface in engagement.

An embodiment of the apparatus in accordance with the invention is characterized in that the element comprises a third contact surface having a third part which extends in the inward direction and having a fourth part which extends at a second angle between 45 and 90 degrees relative to the inward direction, and the gripper comprises a fourth contact surface which cooperates with the third contact surface. Preferably, the gripper or the chassis carries a pin which cooperates with a surface bounding a slot in the element. As a result of this, the first and the second contact surface are also kept in engagement when the element is pivotably mounted. Moreover, such a pin enables a large force to be exerted on the gripper without any large normal forces being exerted on the first and the second contact surface. This is desirable because, for example, teeth on the first and the second contact surface can be damaged by large normal forces.

BRIEF DESCRIPTION OF THE DRAWINGS

An embodiment of the apparatus in accordance with the invention is characterized in that the first angle and the second angle lie between 60 and 70 degrees. This makes the loading mechanism self-braking without seizing. As a result of this, a worm gear transmission is not needed, so that the loading mechanism requires less space.

An embodiment of the apparatus in accordance with the invention is characterized in that the wheel cooperates with the element through contact of a first contact surface of the wheel with a second contact surface of the element, that the first contact surface has first teeth, the second contact surface has second teeth and the first teeth are in mesh with the second teeth. A toothed transmission is advantageous because it enables larger forces to be transmitted than, for example, a frictional transmission.

The invention also relates to a system for recording and/or reproducing information, comprising an apparatus in accordance with the invention and a cartridge which accommodates an information carrier.

The invention will now be described in more detail, by way of example, with reference to the drawings, in which.

DETAILED DESCRIPTION OF THE PREFERRED EMBODIMENTS

Figure 1:
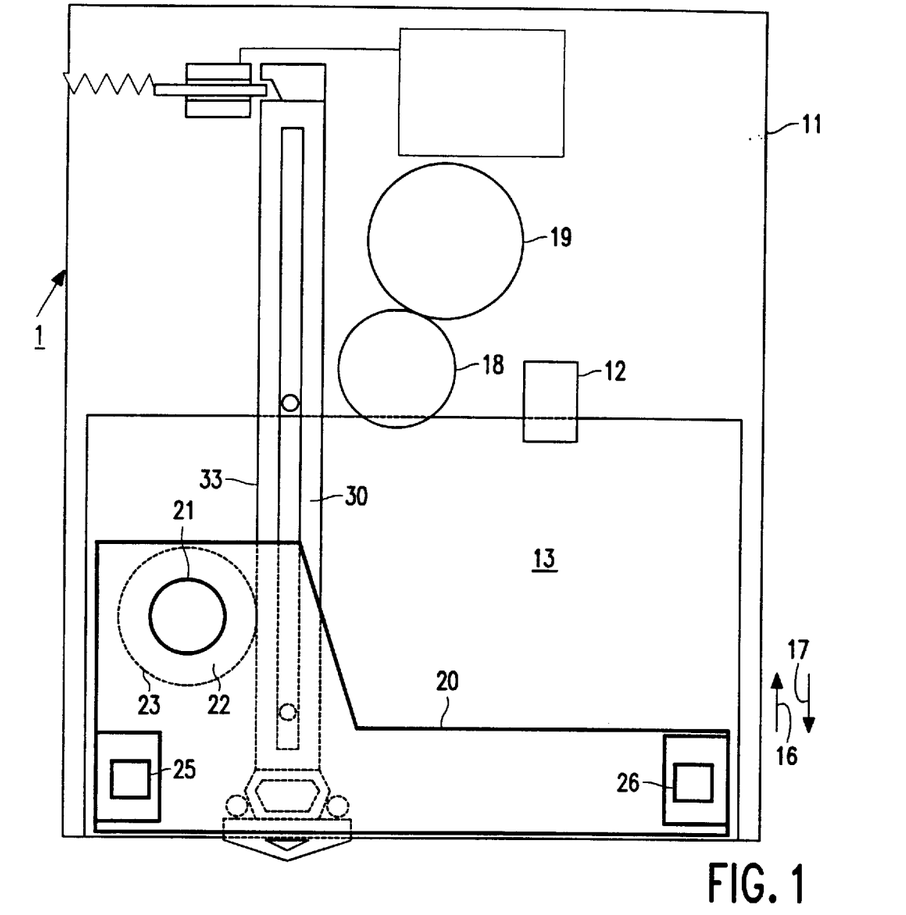
FIG. 1 is a diagrammatic plan view of a first embodiment of the apparatus in accordance with the invention, a gripper of the apparatus being shown in a loading position.
Figure 2:
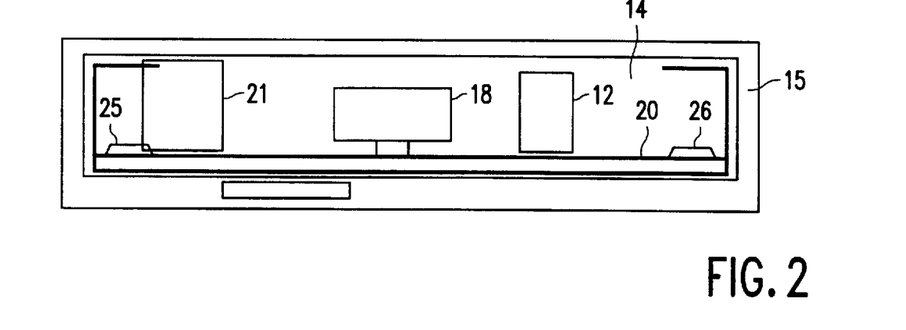
FIG. 2 is a front view of the first embodiment of the apparatus in accordance with the invention.

FIG. 1 shows diagrammatically a plan view of the apparatus in accordance with the invention. The apparatus 1 is a recorder for recording information on a magnetic tape accommodated in a cartridge. The apparatus 1 has a cartridge space 13 for receiving a cartridge and a gripper 20 for gripping a cartridge inserted into the apparatus through an opening 14 in a wall 15 (see FIG. 2). To retain the cartridge the gripper 20 has two resilient projections 25 and 26 which cooperate with recesses in the cartridge (see FIG. 3). The apparatus 1 further comprises a magnetic head 12, a drive roller 18 and a drive motor 19 mounted on a chassis 11. The gripper 20 is movable from a loading position (see FIG. 1) into an operational position (see FIG. 3) by means of a first mechanism. This first mechanism comprises an electric motor 21 and a wheel 22 drivable by the motor, which are both secured to the gripper 20. The wheel 22 has a first contact surface 23 which cooperates with a second contact surface 33. The second contact surface 33 forms part of an element 30 coupled to the chassis 11. When the motor 21 is energized the contact surface 23 will interact with the contact surface 33 and a force will be produced by which the gripper 20 is moved relative to the chassis.

Figure 3:
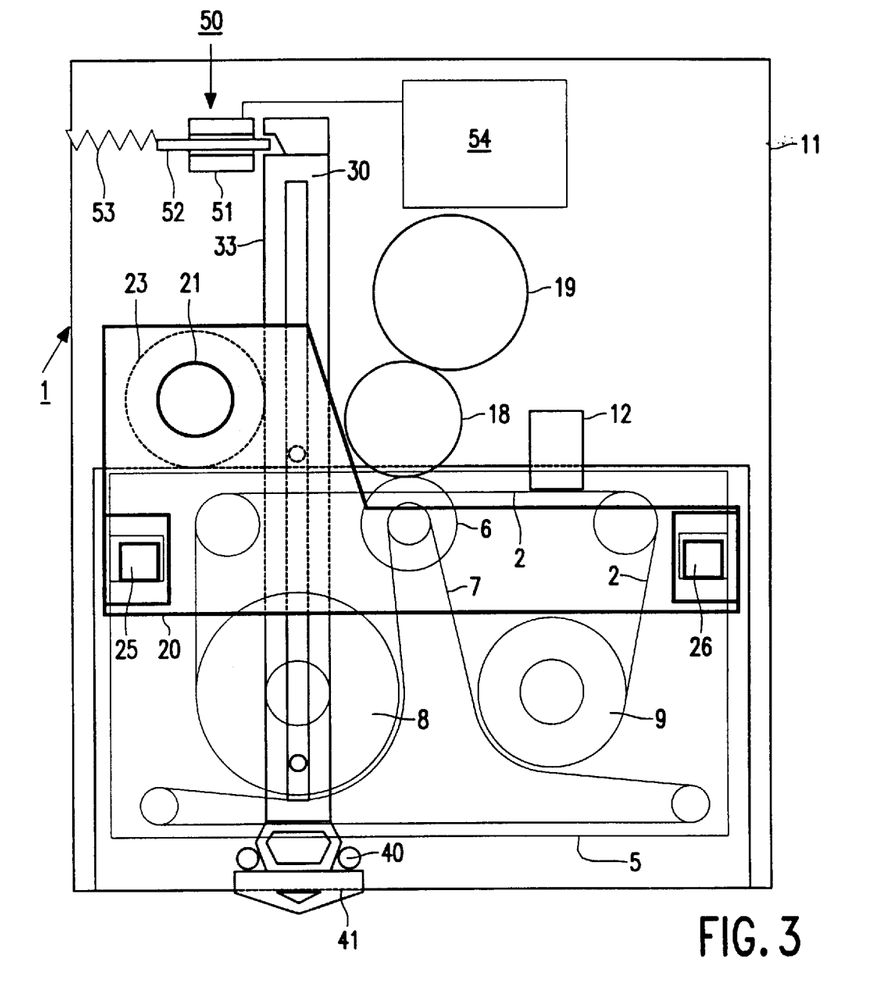
FIG. 3 is a diagrammatic plan view of this first embodiment, the gripper being shown in an operational position.
Figure 4:
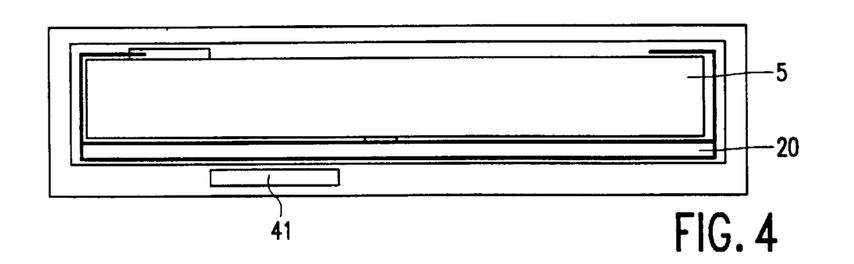
FIG. 4 is a front view showing this first embodiment while the cartridge is inside the apparatus.
Figure 5:
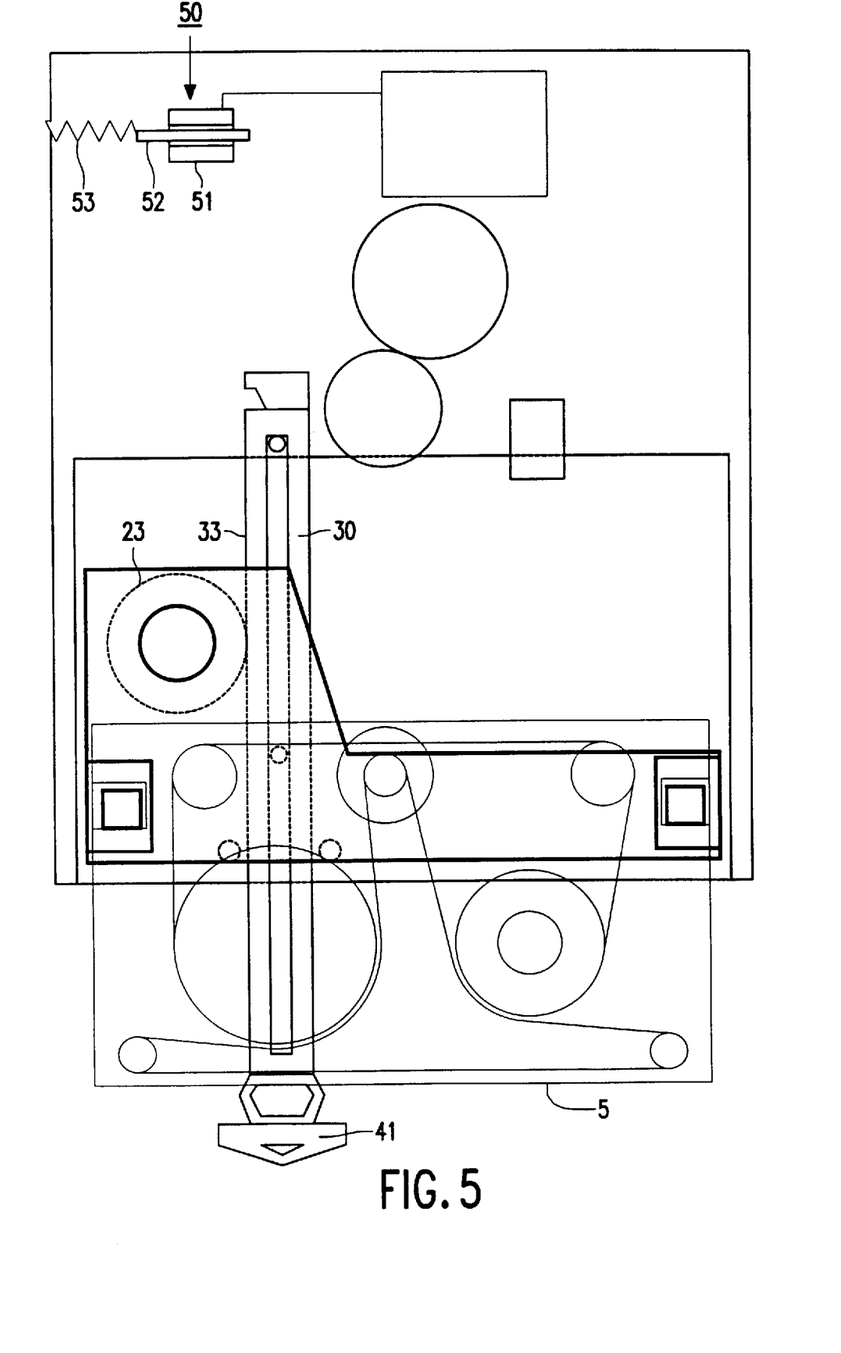
FIG. 5 is a diagrammatic plan view of the first embodiment, in which the gripper has been moved to the loading position by hand.

FIG. 3 is a diagrammatic plan view of the apparatus 1, the gripper 20 and a cartridge 5 being shown in the operational position. FIG. 4 shows a front view of the apparatus in this situation. In the operational position the magnetic head 12 is in contact with a magnetic tape 2 and the drive roller 18 is in contact with a drivable roller 6 of the cartridge 5. When the motor 19 is energized the drivable roller 6 in the cartridge 5 is driven via the drive roller 18. This drivable roller 6 drives a flexible endless belt 7, which in its turn drives tape reels 8 and 9, as a result of which the magnetic tape 2 is moved past the head 12. In the case that the apparatus 1 is defective in such a way that the motor 21 can no longer be energized, a user will nevertheless wish to remove the cartridge 5 from the apparatus, for example, before having the apparatus repaired. For this purpose the apparatus 1 comprises a second mechanism by means of which the gripper 20 can be moved from the operational position to the loading position as shown in FIG. 5. This second mechanism comprises coupling means, in the present case a snap coupling 40, which enables the element 30 to be uncoupled from the chassis 11. In order to preclude that a user removes a cartridge 5 from the apparatus with the aid of the second mechanism while the apparatus 1 is, for example, still making a recording on the magnetic tape 2, the apparatus 1 comprises a locking device 50. The locking device 50 comprises an electromagnet 51 which holds a locking element 52 in a locked position against the force of a spring 53. Thus, the element 30 is locked to the chassis 11 as long as a power supply 54 receives electric power. When the electric power supply of the apparatus 1 fails or is turned off, the electromagnet 51 is no longer energized and the spring 53 will pull the locking element 52 to a position as shown in FIG. 5, as a result of which the locking device 50 is released. In that case a user can release the snap coupling 40 by pulling the handle 41 and pull the element 30 partly out of the apparatus 1. Since the first contact surface 23 of the wheel 22 remains in engagement with the second contact surface 33 of the element 30, the gripper is moved along with the element 30 when the handle 41 is pulled. In this way a user can remove the cartridge 5 from the apparatus to save the information, even if the electrical part of the apparatus does not function.

Figure 6:
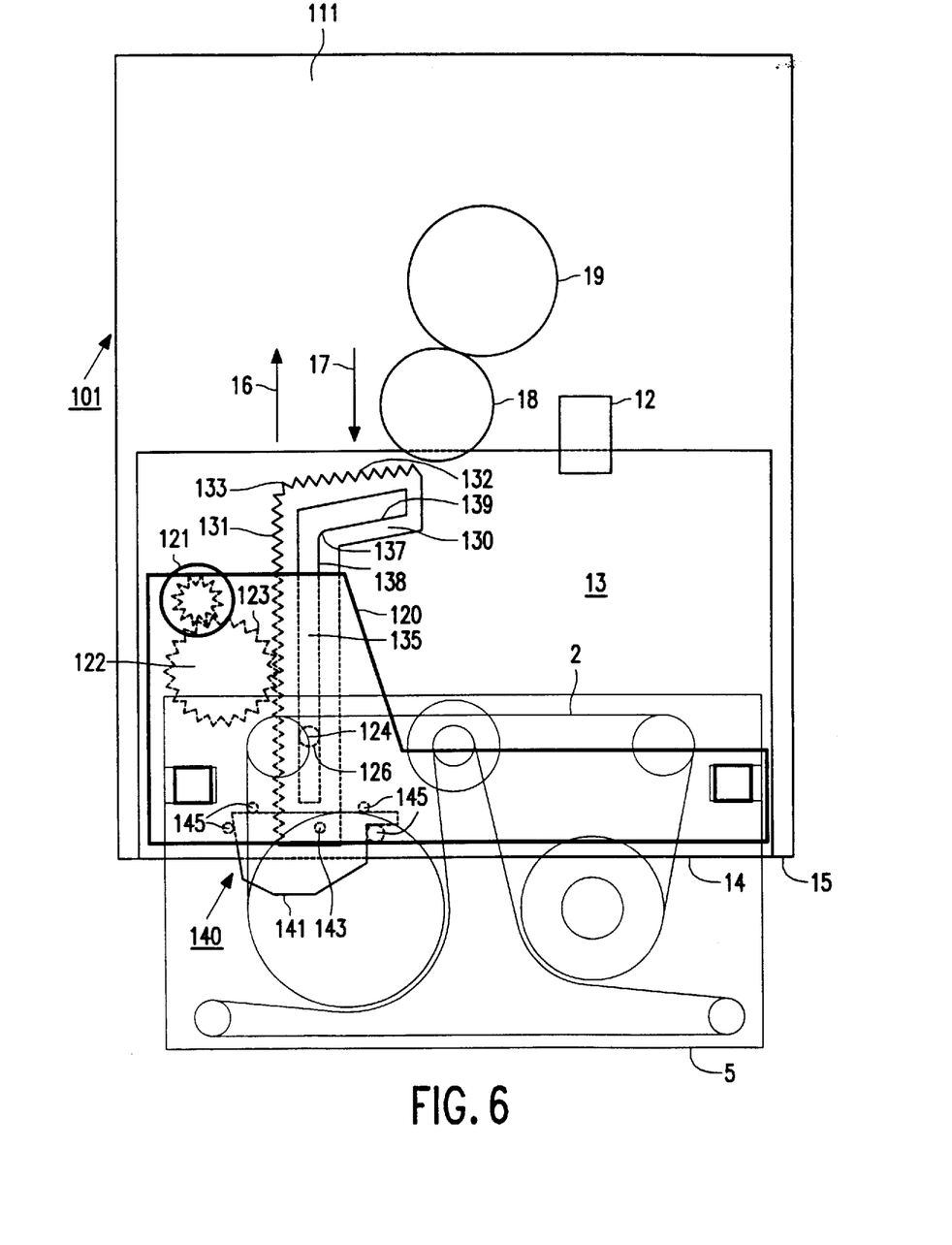
FIG. 6 is a diagrammatic plan view of a second embodiment of the apparatus in accordance with the invention, a gripper being shown in a loading position.

FIG. 6 is a diagrammatic plan view of a second embodiment of the apparatus in accordance with the invention whose gripper is in the loading position. The apparatus 101 differs from the apparatus 1 as shown in FIGS. 1 to 5 in that the second contact surface comprises a first part 131 which extends in the inward direction 16 and a second part 132 which extends at an acute angle relative to the inward direction. In addition, the apparatus 101 also differs from the apparatus 1 in some other points, as will be described hereinafter. The mechanism for the motorized movement of the gripper 120 relative to the chassis 111 again comprises an electric motor 121 and a wheel 122 having a contact surface 123. The contact surface 123 of the wheel 122 has teeth which mesh with teeth 131 of an element 130. The element 130 is pivotably coupled to a handle 141 via a pin coupling 143. The handle 141 is coupled to a chassis 111 via a snap coupling. The snap coupling comprises pins 145 which are mounted on the chassis 111 and between which the handle 141 is clamped so as to be detachable. The gripper 120 has a pin 124, which engages in a slot 135 of the element 130. The pin 124 ensures that the teeth 123 and teeth 133 remain in mesh with each other in spite of the fact that the element 130 is pivotably coupled to the chassis 111 via the handle 141.

Figure 7:
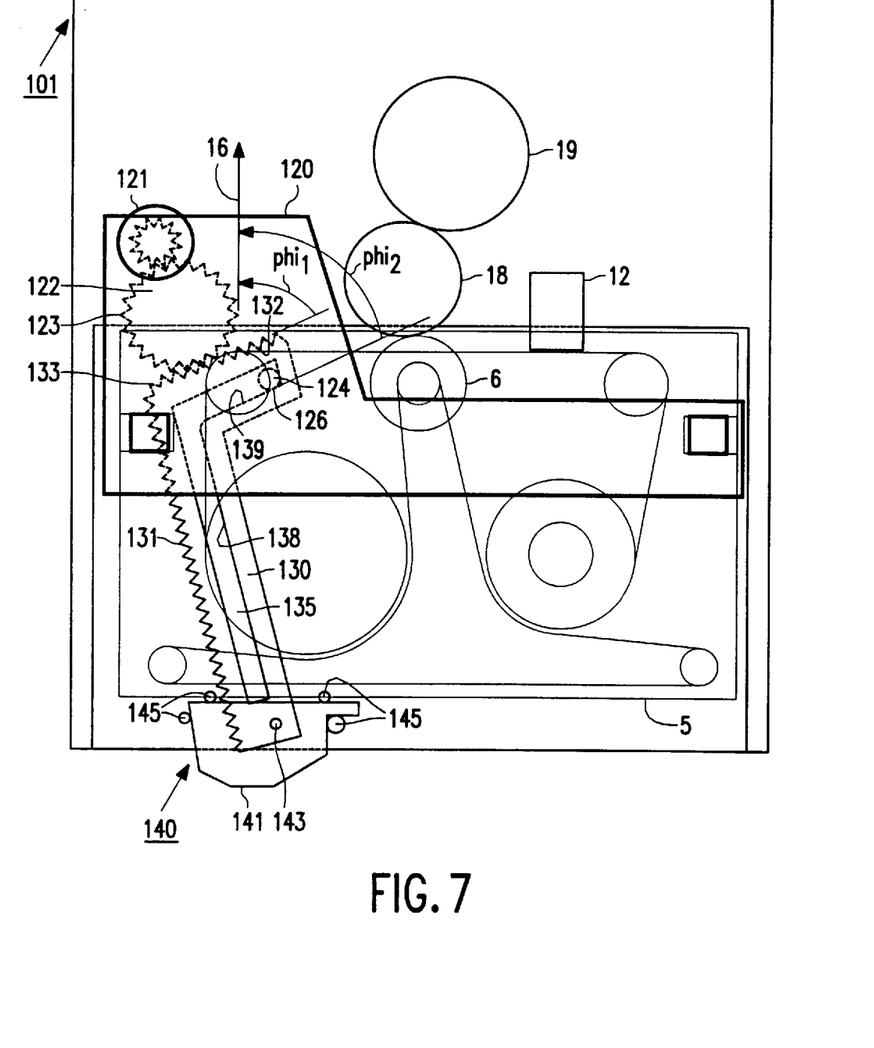
FIG. 7 is a plan view of the second embodiment, the gripper being shown in the operational position.

FIG. 7 shows the apparatus 101 in a situation in which the cartridge 5 and the gripper 120 are in the operational position. In this situation the teeth 123 of the wheel 122 are in mesh with the second part 132 of the teeth 133 and the element 130 has been rotated about the pin 143 with respect to the situation shown in FIG. 6. The second part 132 of the teeth 133 is disposed at an acute angle phi$_2$ with respect to the inward direction 16. As a result of this, a given rotation of the wheel 122 corresponds to a smaller movement of the gripper 120 in the inward direction 16 than in the case that the wheel 122 is in mesh with the first part 131 of the teeth 133. If the motor 122 is driven with a constant speed this results in the cartridge 5 being drawn into apparatus with a comparatively high speed, starting from the situation shown in FIG. 6, after which it is moved into the operational position with a comparatively low speed when the wheel 122 comes into mesh with the second part of the teeth 132. The second part of the teeth 132 in fact yields another transmission ratio between the motor 121 and the movement of the gripper 120.

The surface 126 of the pin 124 on the gripper 120 cooperates with a surface 139 bounding a slot in the element 130. This enables a substantial force to be exerted on the gripper 120 via a pin 124 without any large normal forces being produced on the contact surface 123 of the wheel 122. By making the angle phi$_2$ for example 70°, it is achieved that the mechanism for moving the gripper 120 is self-braking. For said value of the angle phi$_2$ it appears that the forces exerted on the gripper 120 by the drive roller 18 and the head 12 via the cartridge 5 do not result in a movement of the gripper 120.

Figure 8:
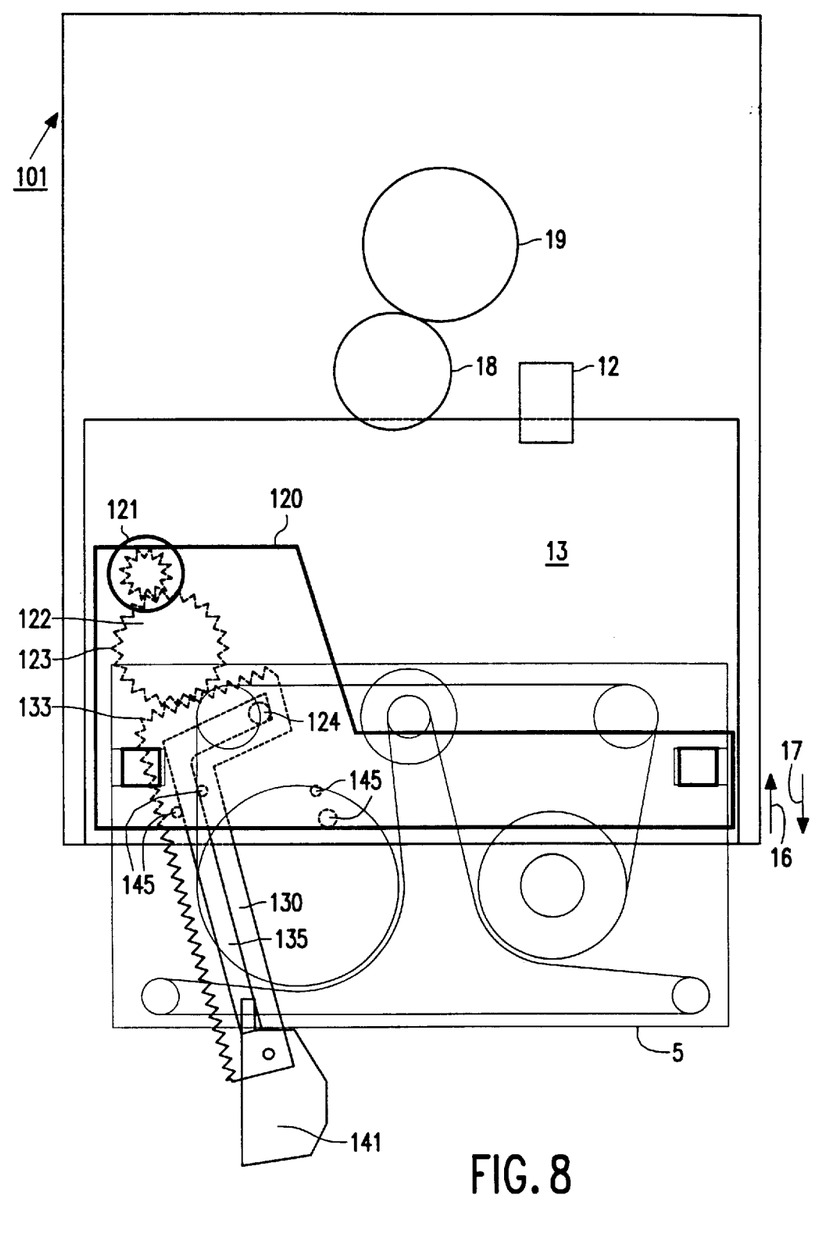
FIG. 8 is a plan view of the second embodiment, in which the gripper has been moved to the loading position by hand.

FIG. 8 shows the apparatus 101 in a situation in which the gripper 120 with the cartridge 5 have been moved into the loading position by hand. This situation is obtained by pulling the handle 141 in the situation illustrated in FIG. 7. The handle 141 is then disengaged from the pins 145, as a result of which the element 130 can be pulled partly out of the apparatus 101. The gripper 120 with the cartridge 5 is then moved to the loading position in that the pin 124, which is secured to the gripper 120, engages the slot 135 in the element 130. Preferably, the handle 141 is countersunk in the front of the apparatus, so that paper-clip or fingernail is needed to swing up the handle.

Figure 9:
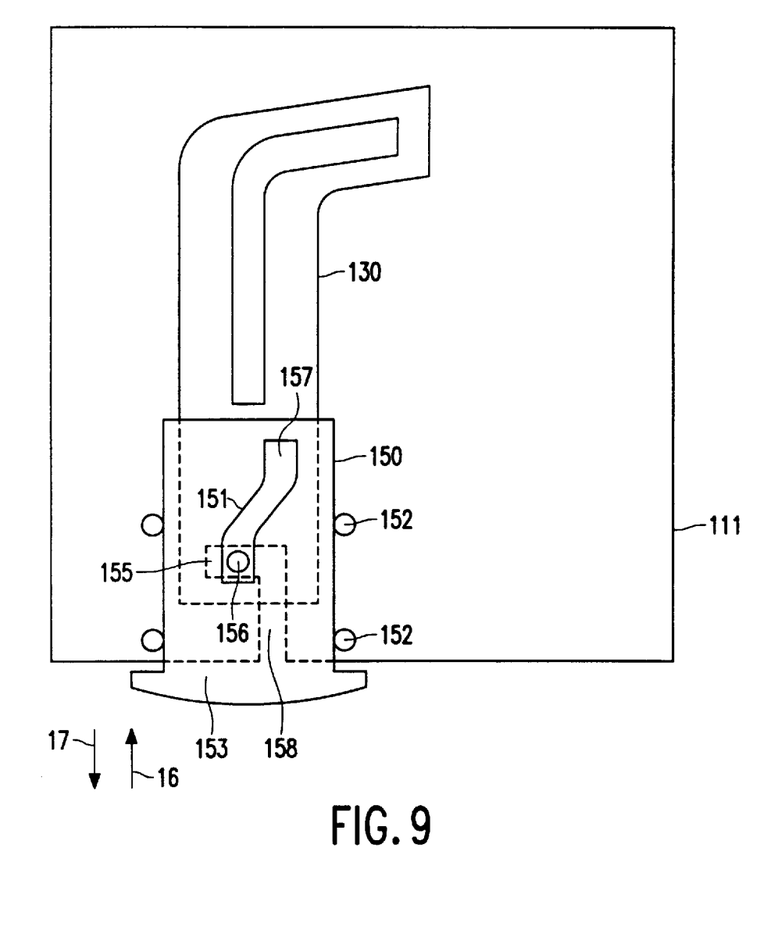
FIG. 9 shows an example of the coupling means.

FIG. 9 shows an alternative for the coupling means. The chassis 111 as a first slot 155, in which a pin is positioned by means of a second slot 157 in a slide 150. The pin 156 is secured to the element 130, as a result of which the element 130 is pivotably coupled to the chassis 111 and at the same time the element 130 is locked against movement in the outward direction 17. The slide 150 is guided by pins 152 mounted on the chassis 111. The slide can be moved in the outward direction 17 by pulling the handle 153. During such a movement the guide surface 151 will push the pin 156 out of the slot 155 into the slot 158, in which position the element 130 can be moved in the outward direction 17 by continuing to pull the handle 153. The advantage of this construction is that large forces can be exerted on the element 130 in the inward direction 16 or the outward direction 17 without the element 130 being moved relative to the chassis 111. Another advantage is that the position of the element 130 relative to the chassis 111 is accurately defined.

It is to be noted that the invention is not limited to an apparatus as described above. The invention can be used with similar advantages in an apparatus for the storage and/or reproduction of information on/from a disc-shaped information carrier in a cartridge. Moreover, other constructions of the first mechanism are possible. For example, the element 130 can be coupled non-pivotably to the chassis 111, the motor 121 and/or the wheel 122 being connected to the gripper 120 in such a manner that they are movable in a direction perpendicular to the inward direction 16, so that the wheel 122 can follow the second teeth 132. Besides, it is also possible to construct the second part of the second contact surface and the fourth part of the third contact surface as a cylindrical segment or another curved surface instead of as a flat surface, the tangent to this curved surface being inclined at an angle between 45 and 90 degrees relative to the inward direction. In addition, the invention can be used in apparatuses intended for reading or writing magnetic cards, or chip cards.

I claim:

1. An apparatus for the storage and/or reproduction of information on/from an information carrier accommodated in a cartridge, which apparatus comprises
    a chassis,
    a device for cooperation with the information carrier,
    a cartridge space for receiving a cartridge, which cartridge space is accessible via an opening in a wall of the apparatus,
    a movable gripper arranged in the cartridge space and adapted to grip the cartridge,
    a first mechanism comprising an electric motor and a wheel drivable by the motor, which wheel cooperates with an element for moving the gripper in an inward direction from a loading position, in which the cartridge can be inserted, into an operational position, in which the information carrier can cooperate with the device, and for moving the gripper in an outward direction from the operational position to the loading position, and a second mechanism adapted to move the gripper in an outward direction from the operational position to the loading position without the motor being energized, characterized in that the electric motor is mounted on the gripper, the second mechanism comprises coupling means adapted to selectively couple the element and the chassis; and said second mechanism moves said gripper through engagement of said second mechanism with said wheel.

2. An apparatus as claimed in claim 1, characterized in that the coupling means comprise a slide, which slide has a guide surface which cooperates with the element to move the element from a position in which the element is locked against movement in the outward direction relative to the chassis to a position in which the element is movable in the outward direction, and the apparatus comprises a handle for actuating the slide.

3. An apparatus as claimed in claim 2, characterized in that the coupling means comprise a locking device for locking the element relative to the chassis.

4. An apparatus as claimed in claim 3, characterized in that the apparatus is adapted to unlock the locking device when the electric power supply of the apparatus cuts out.

5. An apparatus as claimed in claim 4, characterized in that the wheel cooperates with the element through contact of a first contact surface of the wheel with a second contact surface of the element, that the first contact surface has first teeth, the second contact surface has second teeth, and the first teeth are in mesh with the second teeth.

6. An apparatus as claimed in claim 3, characterized in that the wheel cooperates with the element through contact of a first contact surface of the wheel with a second contact surface of the element, that the first contact surface has first teeth, the second contact surface has second teeth, and the first teeth are in mesh with the second teeth.

7. An apparatus as claimed in claim 2, characterized in that the wheel cooperates with the element through contact of a first contact surface of the wheel with a second contact surface of the element, that the first contact surface has first teeth, the second contact surface has second teeth, and the first teeth are in mesh with the second teeth.

8. An apparatus as claimed in claim 1, characterized in that the coupling means comprise a locking device for locking the element relative to the chassis.

9. An apparatus as claimed in claim 3, characterized in that the apparatus is adapted to unlock the locking device when the electric power supply of the apparatus cuts out.

10. An apparatus as claimed in claim 9, characterized in that the wheel cooperates with the element through contact of a first contact surface of the wheel with a second contact surface of the element, that the first contact surface has first teeth, the second contact surface has second teeth, and the first teeth are in mesh with the second teeth.

11. An apparatus as claimed in claim 8, characterized in that the wheel cooperates with the element through contact of a first contact surface of the wheel with a second contact surface of the element, that the first contact surface has first teeth, the second contact surface has second teeth, and the first teeth are in mesh with the second teeth.

12. An apparatus as claimed in claim 1, characterized in that the wheel cooperates with the element through contact of a first contact surface of the wheel with a second contact surface of the element, that the first contact surface has first teeth, the second contact surface has second teeth, and the first teeth are in mesh with the second teeth.

13. A system for recording and/or reproducing information, comprising an apparatus as claimed in claim 1 and a cartridge which accommodates an information carrier.

* * * * *